US009316559B2

(12) United States Patent
Döbler

(10) Patent No.: US 9,316,559 B2
(45) Date of Patent: Apr. 19, 2016

(54) LEAK DETECTION APPLIANCE

(75) Inventor: Ulrich Döbler, Wermelskirchen (DE)

(73) Assignee: Inficon GMBH, Köln (DE)

( * ) Notice: Subject to any disclaimer, the term of this patent is extended or adjusted under 35 U.S.C. 154(b) by 429 days.

(21) Appl. No.: 13/813,575

(22) PCT Filed: Jul. 20, 2011

(86) PCT No.: PCT/EP2011/062472
§ 371 (c)(1),
(2), (4) Date: Apr. 9, 2013

(87) PCT Pub. No.: WO2012/016838
PCT Pub. Date: Feb. 9, 2012

(65) Prior Publication Data
US 2013/0186183 A1    Jul. 25, 2013

(30) Foreign Application Priority Data
Aug. 4, 2010   (DE) .......................... 10 2010 033 373

(51) Int. Cl.
*G01M 3/26* (2006.01)
*F04D 19/04* (2006.01)
*G01M 3/20* (2006.01)
*F04D 27/02* (2006.01)

(52) U.S. Cl.
CPC ............ *G01M 3/26* (2013.01); *F04D 19/046* (2013.01); *F04D 27/0269* (2013.01); *G01M 3/205* (2013.01)

(58) Field of Classification Search
CPC .............................. F04D 19/046; G01M 3/26
USPC ........................................ 73/49.3, 49.2, 40
See application file for complete search history.

(56) References Cited

U.S. PATENT DOCUMENTS

| 4,919,599 A | * | 4/1990 | Reich et al. ............... 417/423.4 |
| 5,585,548 A | | 12/1996 | Grosse Bley et al. |
| 5,870,199 A | | 2/1999 | Wurbs et al. |
| 5,880,357 A | * | 3/1999 | Bohm ........................... 73/40.7 |
| 5,974,864 A | * | 11/1999 | Bohm ........................... 73/40.7 |

(Continued)

FOREIGN PATENT DOCUMENTS

| DE | 4228313 A1 | 3/1994 |
| DE | 4229313 A1 | 3/1994 |

(Continued)

OTHER PUBLICATIONS

European Patent Office International Search Report and Written Opinion for corresponding International Application No. PCT/EP2011/062472 dated Sep. 16, 2011 in the German Language (10 pgs).

(Continued)

*Primary Examiner* — Hezron E Williams
*Assistant Examiner* — Marrit Eyassu
(74) *Attorney, Agent, or Firm* — Harris Beach PLLC

(57) ABSTRACT

The leak detection appliance has a test inlet to which a test chamber containing the test specimen can be connected. A high-vacuum pump produces a high vacuum in a test gas detector. A backing pump contains two pump stages. In order to evacuate the test chamber, the pump stages are operated in parallel mode, with their suction capabilities being added. When the necessary vacuum has been achieved, the pump stages are operated in series in order to produce the necessary high vacuum which is required for high detection sensitivity on the test gas detector.

8 Claims, 1 Drawing Sheet

(56) References Cited

U.S. PATENT DOCUMENTS 6,354,141 B1 3/2002 Pierrejean et al.
2006/0280615 A1* 12/2006 Bohm et al. .................. 417/63
2009/0277250 A1 11/2009 Wetzig

FOREIGN PATENT DOCUMENTS

| DE | 102006056215 | A1 | 6/2008 |
| EP | 0585893 | A1 | 3/1994 |
| EP | 1008841 | A1 | 6/2000 |

OTHER PUBLICATIONS

European Patent Office International Search Report for corresponding International Application No. PCT/EP2011/062472 dated Sep. 16, 2011 in the English Language (4 pgs).

* cited by examiner

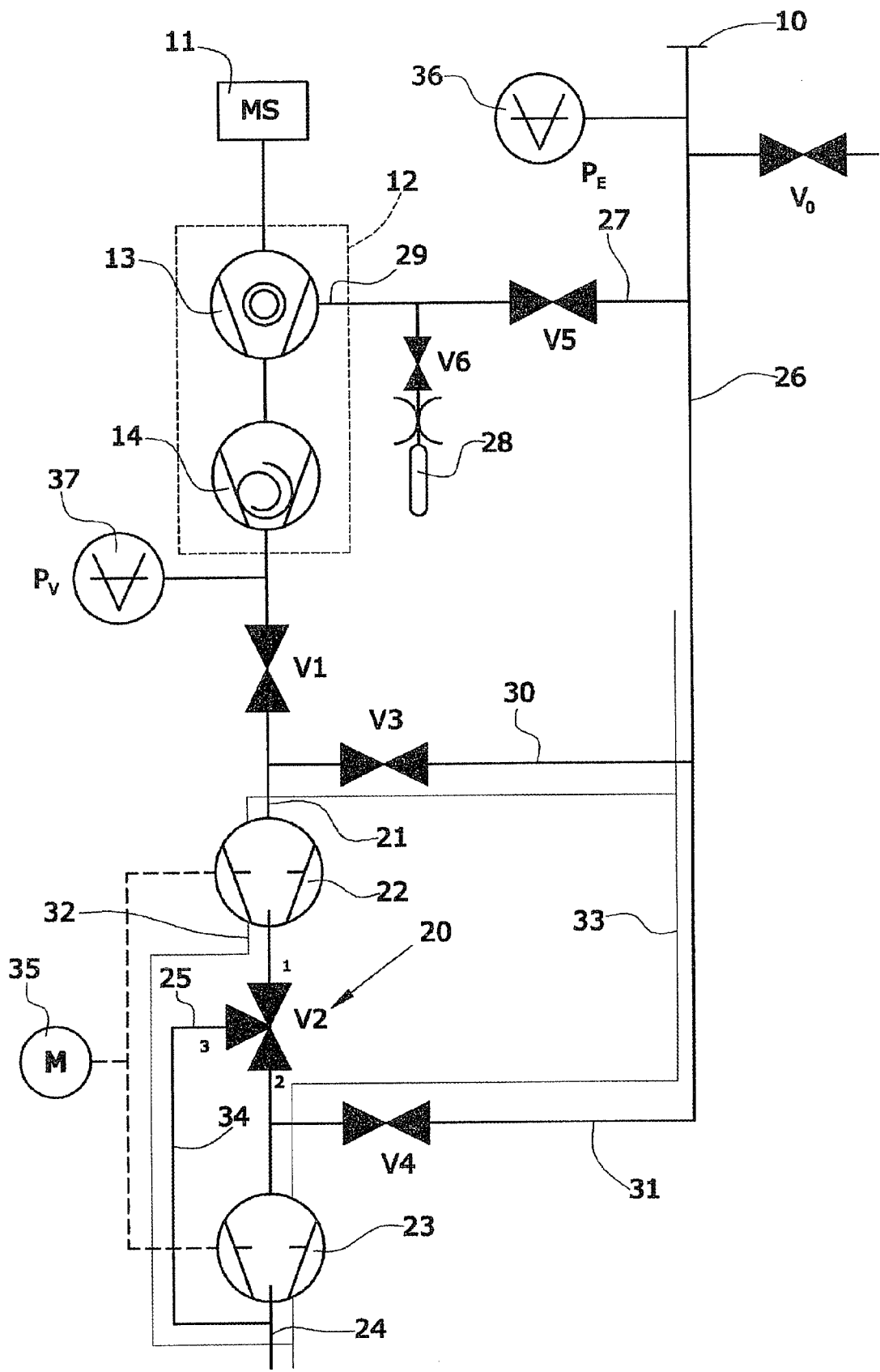

LEAK DETECTION APPLIANCE

This application is a national stage application under 35 U.S.C. §371 of PCT Application No. PCT/EP2011/062472, filed Jul. 20, 2011, which claims priority to and the benefit of German Application No. 102010033373.5 filed on Aug. 4, 2010, which are incorporated herein by reference in their entirety.

The invention relates to a leak detection apparatus comprising a test inlet for connection of a test chamber, a high-vacuum pump connected to a test gas detector, and a backing pump (pre-vacuum pump) including at least two pump stages.

There are already known leak detection apparatuses for connection to a test chamber accommodating the test specimen to be tested for leak tightness. The test specimen contains a light test gas, such as e.g. helium, which can be detected by a test gas detector, e.g. a mass spectrometer. The test gas detector requires a high vacuum of less than $10^{-4}$ mbar. This high vacuum is generated by a high-vacuum pump which is operated in series with a backing pump. The high-vacuum pump normally comprises a turbomolecular pump. The backing pump includes at least a displacement pump stage, particularly a rotary vane vacuum pump.

A pump system for a leak detection apparatus is described in DE 42 28 313 A1 (Leybold). In this system, the high-vacuum pump includes two serially operated molecular pump stages, and the backing pump consists of a sole pump stage. Further, leak detection apparatuses are known which comprise a two-stage backing pump. The two-stage backing pump has the purpose of effecting a high suppression of the helium background (partial pressure of the helium) contained in the ambient air so as to keep the helium background away from the test gas detector. In the two-stage design of the backing pump, the compression ratios of the two pump stages are multiplied. The pump stages are usually realized with a common housing block and are connected to each other in the interior of the housing block, while offering the possibility of access to the connection of the two pump stages.

When evacuating the test chamber accommodating the test specimen, the pump-off process (roughing) should be performed with high suction capacity in order to minimize the time required for roughing. EP 1 008 841 B1 (Alcatel) discloses a method wherein, during the roughing process, a backing pump is operated at a high rotational speed, whereas the measurement process is performed with low suction capacity of the backing pump but with a high pressure difference.

It is an object of the invention to provide a leak detection apparatus which allows for a roughing operation and a detection operation and which makes it possible to switch between said two operational modes in a simple manner.

The leak detection apparatus according to the present invention is defined by claim 1. It is characterized in that a tap is provided between the pump stages of the backing pump and that these pump stages can be selectively operated in series or in parallel.

The two pump stages, which in detection operation are connected serially, can be switched into a parallel state for roughing. This has the advantage that the roughing process for the test chamber will be performed with high suction capacity and will take only little time. The detection operation, on the other hand, will be performed with lower suction capacity and increased vacuum. Thus, the pump stages of the backing pump are used in different operational modes. This has the advantage that the roughing process will be performed within a relatively short time and that, in test operation, the pump stages, which for roughing are switched in parallel, will be operated in series. In this manner, a high efficiency of both pump stages is guaranteed in each operational mode.

According to a preferred embodiment of the invention, a valve device is provided between the pump stages of the backing pump, said valve device, when in a first state, connecting the outlet of the first pump stage to the inlet of the second pump stage, and, when in a second state, to the outlet of the second pump stage. This allows for a simple and inexpensive realization of the switching between parallel operation and serial operation. The valve device can be a three-way valve adapted to be switched between a passage position and a branch-off position. Further, a bypass valve can be provided, connecting the test inlet to the inlet of the second pump stage of preliminary vacuum chamber. Said bypass valve is controlled to be opened when the valve device is in its second state (branch-off position).

Suitably, the pump stages of the backing pump are driven synchronously by means of a common drive. The drive is controlled in such a manner that a higher rotational speed will be set for rough pumping of the gas contained in the test chamber and that a lower rotational speed will be set after the roughing process has been terminated. Thereby, the effect of the increase of the roughing performance can be still further increased.

The controlling of the rotational speed of the drive can be carried out in dependence on the pressure at the test inlet. The pressure at the test inlet allows for conclusions on the pressure in the test chamber and on the respective required pump operation.

An exemplary embodiment of the invention will be explained in greater detail hereunder with reference to the sole FIGURE in the drawing.

The drawing shows a schematic diagram of a leak detection apparatus according to the invention.

The leak detection apparatus illustrated herein is a counterflow leak detector. The detector comprises a test inlet 10 for connection thereto of a test chamber, not shown, in which the tests specimen is to be placed. The test specimen which is to be tested for leak-tightness will be filled with a test gas, e.g. helium, and the test chamber will be evacuated by a roughing process. After a high vacuum has been generated, it will be detected, using test gas detector 11, whether test gas has leaked from the test specimen into the test chamber.

Said test gas detector 11 is connected to a high-vacuum pump 12 comprising a first pump stage 13 and a second pump stage 14. The first pump stage preferably is a turbomolecular pump, and the second pump stage 14 is a molecular pump. Both pump stages are operated in series. The outlet of the second pump stage 14 is connected, via a switchable valve V1, to the inlet 21 of a backing pump 20. The latter consists of a first pump stage 22 and a second pump stage 23. The outlet of the second pump stage 23 forms the outlet 24 of backing pump 20 which leads into the atmosphere.

Test inlet 10 is connected to an inlet conduit 26. From this conduit, a first branch conduit 27, provided with an inlet valve V5, leads to an intermediate connector 29 of the first pump stage 13 of high-vacuum pump 12. Also connected to said intermediate connector is a test leak 28 which includes a calibrated test gas source adapted to emit test gas in a dosed volume flow, thus allowing to perform a calibration of test gas detector 11. A second branch conduit 30 from inlet conduit 26 leads, via a shut-off valve V3, to the inlet of the first pump stage 22 of backing pump 20. A third branch conduit 31 leads from inlet conduit 26 via a bypass valve V4 to the inlet of the second pump stage 23.

Between the first pump stage 22 and the second pump stage 23, there is arranged a valve device V2 which herein is formed as a three-way valve comprising connectors 1, 2 and 3. Connector 3 forms an intermediate connector 25 between pump stages 22 and 23. The valve device can be switched between a passage position 1-2 and a branch-off position 1-3. If the valve device V2 is in said passage position 1-2, the bypass valve V4 is blocked. If the valve device V2 is in said branch-off position 1-3, the bypass valve V4 is in its open state. In this manner, the pump stages 22, 23 can be switched between serial operation and parallel operation. In serial operation, valve device V2 is in the passage position 1-2. In parallel operation, it is in the branch-off position 1-3. The flow paths generated in parallel operation are marked by 32 and 33. One of these flow paths, 32, leads through pump stage 22 and, via the parallel path 34, around the second pump stage 23 to outlet 24. The other parallel path 33 leads from the inlet conduit 26 past the first pump stage 22 to the bypass valve V4 and from there to the second pump stage 23.

The two pump stages 22 and 23 are displacement pumps, e.g. rotary vane vacuum pumps. The pump stages can have a common housing block. The required valves can be arranged externally or be integrated into the housing block.

The pump stages 22 and 23 are driven by a common drive 35 which is realized as a speed-controlled engine. Said drive is controlled in dependence on the pressure $P_e$ at test inlet 10 which is captured by a pressure sensor 36. As long as the pressure at test inlet 10 exceeds a limit value, the pump stages 22, 23 of the backing pump 20 are caused to work in parallel operation. Once the pressure has dropped below the limit value, the pump stages are caused to work in serial operation. Pressure sensor 36 controls also the rotational speed of drive 35.

A further pressure sensor 37 is arranged at the outlet of high-vacuum pump 12 for measuring the pressure prevailing at this site. This pressure typically is <10 mbar. The pressure at the intermediate connector 29 of pump stage 13 of high-vacuum pump 12 is typically <0.1 mbar, and the pressure in the test gas detector 11 is <$10^{-4}$ mbar.

Inlet conduit 26 has a venting valve V0 connected to it, thus allowing for venting the vacuum region after termination of operation.

The invention claimed is:

1. A leak detection apparatus comprising:
a test inlet for connection of a test chamber, a high-vacuum pump connected to a test gas detector, and a backing vacuum pump including at least two pump stages wherein a tap is provided between said pump stages of the backing vacuum pump and that the pump stages are selectively operated in series for a leak detection, or in parallel for roughing of the test chamber;
wherein a tap valve device which comprises said tap is provided in a suction line connecting the outlet of the first pump stage with the inlet of the second pump stage of the backing pump, said tap valve device, when in a first state, connecting the outlet of the first pump stage to the inlet, and, when in a second state, to the outlet of the second pump stage via said tap; and
wherein a bypass valve is operative to connect the test inlet to the inlet of the second pump stage and said bypass valve is opened when the tap valve device is in its second state, said bypass valve being separate from the tap valve device.

2. The leak detection apparatus according to claim 1, wherein the leak detection apparatus is a counterflow leak detector wherein the test inlet is connected to an intermediate connector of the high-vacuum pump.

3. The leak detection apparatus according to claim 1, wherein the two pump stages of the backing vacuum pump are driven synchronously by a common drive, and wherein said drive is controlled in such a manner that a higher rotational speed is set for roughing the gas contained in the test chamber and that a lower rotational speed is set after the roughing process has been terminated.

4. The leak detection apparatus according to claim 3, wherein the respective rotational speed is selected in dependence on the pressure at the test inlet.

5. A leak detection apparatus comprising:
a test inlet for connection of a test chamber;
a high-vacuum pump connected to a test gas detector;
a backing vacuum pump comprising at least a first pump stage and a second pump stage, said backing vacuum pump configurable for a leak detection or a roughing of the test chamber;
a three-way valve comprising a tap, said three-way valve disposed between said at least first pump stage and said second pump stage of the backing vacuum pump in a suction line connecting an outlet of the first pump stage with an inlet of the second pump stage of said backing vacuum pump;
a bypass valve operative to connect the test inlet to the inlet of the second pump stage; and
wherein said at least first pump stage and said second pump stage are selectively operated in series for said leak detection, or in parallel for said roughing of the test chamber, such that
when said three-way valve is in a first state in series for a leak detection, the outlet of the first pump stage is connected to the inlet of said second pump stage; and
when said three-way valve is in a second state in parallel for roughing of the test chamber, the outlet of the first pump stage is connected to the outlet of the second pump stage via said tap, and said bypass valve is open.

6. The leak detection apparatus according to claim 5, wherein the leak detection apparatus is a counterflow leak detector wherein the test inlet is connected to an intermediate connector of the high-vacuum pump.

7. The leak detection apparatus according to claim 5, wherein the two pump stages of the backing vacuum pump are driven synchronously by a common drive, and wherein said drive is controlled in such a manner that a higher rotational speed is set for roughing the gas contained in the test chamber and that a lower rotational speed is set after the roughing process has been terminated.

8. The leak detection apparatus according to claim 7, wherein the respective rotational speed is selected in dependence on the pressure at the test inlet.

* * * * *